(12) United States Patent
Eloo et al.

(10) Patent No.: US 9,079,333 B2
(45) Date of Patent: Jul. 14, 2015

(54) PELLETIZING DEVICE AND BLADE HEAD AND/OR GRINDING HEAD FOR SUCH A PELLETIZING DEVICE

(75) Inventors: Michael Eloo, Xanten (DE); Juergen Veltel, Kavelaer (DE)

(73) Assignee: GALA KUNSTSTOFF-UND KAUTSCHUK-MASCHINEN GMBH, Xanten-Birten (DE)

( * ) Notice: Subject to any disclaimer, the term of this patent is extended or adjusted under 35 U.S.C. 154(b) by 542 days.

(21) Appl. No.: 12/734,337

(22) PCT Filed: Aug. 11, 2008

(86) PCT No.: PCT/EP2008/006609
§ 371 (c)(1),
(2), (4) Date: Apr. 26, 2010

(87) PCT Pub. No.: WO2009/052882
PCT Pub. Date: Apr. 30, 2009

(65) Prior Publication Data
US 2010/0255135 A1  Oct. 7, 2010

(30) Foreign Application Priority Data
Oct. 24, 2007  (DE) ..................... 20 2007 014 853 U

(51) Int. Cl.
*B29B 9/06* (2006.01)
*B26D 1/16* (2006.01)

(52) U.S. Cl.
CPC ... *B29B 9/06* (2013.01); *B26D 1/16* (2013.01); *B29B 9/065* (2013.01)

(58) Field of Classification Search
CPC ............ B29B 9/02; B29B 9/06; B29B 9/065; B30B 11/28; B30B 11/161; B28B 3/26; B26D 1/12; B26D 1/14; B26D 1/141; B26D 1/143; B26D 1/15; B26D 1/153; B26D 1/16; B26D 1/165; B26D 1/18; B26D 1/185; B29C 47/12; B29C 47/30
USPC ........ 425/67, 306, 307, 310, 311, 313, 382 R, 425/382.2, 382.3, 464, 465, 466, 309, 316; 264/140, 142
See application file for complete search history.

(56) References Cited

U.S. PATENT DOCUMENTS 4,019,414 A * 4/1977 Thomas et al. .............. 83/356.3
4,123,207 A * 10/1978 Dudley .......................... 425/67
(Continued)

FOREIGN PATENT DOCUMENTS

AT   502 895 A1   6/2007
DE   31 26 550 A1  7/1982
(Continued)

*Primary Examiner* — Seyed Masoud Malekzadeh
(74) *Attorney, Agent, or Firm* — Jacobson Holman, PLLC.

(57) ABSTRACT

A pelletizer, preferably in the form of an underwater pelletizer, having a cutter and/or grinding head and a tool carrier is provided. The tool carrier can rotatably be driven about a tool carrier axis of rotation, and at least one cutting and/or grinding tool, which is attached to the tool carrier and is spaced from the tool carrier axis of rotation, is used to knock off plastic melt emerging from a pelletizer die plate and/or for grinding the pelletizer die plate. In one embodiment, the cutting and/or grinding tool rotates together with the tool carrier about its tool carrier axis of rotation, and in another embodiment, the cutting and/or grinding tool can rotate about its own axis of rotation relative to the tool carrier.

20 Claims, 7 Drawing Sheets

(56) References Cited

U.S. PATENT DOCUMENTS

| | | | | |
|---|---|---|---|---|
| 4,327,050 | A | * | 4/1982 | Salmon .................... 264/142 |
| 4,671,756 | A | * | 6/1987 | Bertolotti ................. 425/142 |
| 4,800,792 | A | * | 1/1989 | Bertolotti ................. 83/356.3 |
| 5,525,052 | A | * | 6/1996 | Czarnetzki et al. ......... 425/183 |
| 5,587,186 | A | * | 12/1996 | Voigt ....................... 425/310 |
| 5,665,402 | A | * | 9/1997 | Czarnetzki et al. ......... 425/183 |
| 5,711,492 | A | * | 1/1998 | Cheladze .................. 241/220 |
| 6,793,473 | B1 | * | 9/2004 | Fridley ..................... 425/67 |
| 2008/0000340 | A1 | | 1/2008 | Dahlheimer |

FOREIGN PATENT DOCUMENTS

| | | |
|---|---|---|
| DE | 44 22 200 A1 | 1/1996 |
| DE | 20 2004 008 230 U | 10/2004 |
| DE | 10 2004 049 862 A1 | 4/2006 |
| EP | 0 693 346 A1 | 1/1996 |
| GB | 363229 | 12/1931 |
| GB | 1029149 | 5/1966 |
| JP | 10-151622 | 6/1998 |
| JP | 2004-330549 | 11/2004 |

* cited by examiner

PELLETIZING DEVICE AND BLADE HEAD AND/OR GRINDING HEAD FOR SUCH A PELLETIZING DEVICE

This is a national stage of PCT/EP08/006609 filed Aug. 11, 2008 and published in German, which has a priority of German no. 20 2007 014 853.4 filed Oct. 24, 2007, hereby incorporated by reference.

BACKGROUND OF THE INVENTION

1. Field of the Invention

The present invention relates to a pelletizer preferably in the form of an underwater pelletizer. In particular, the invention relates to a cutter and/or grinding head for such pelletizer, including a tool carrier which can be rotatably driven about a tool carrier axis of rotation, and at least one cutting and/or grinding tool, which is attached to the tool carrier and is spaced from the tool carrier axis of rotation, for knocking off plastic melt emerging from a pelletizer die plate and/or for grinding the pelletizer die plate.

2. Description of the Related Art

Pelletizers, such as underwater pelletizers, usually have a pelletizer die plate with a plurality of bores or channels, through which plastic melt is pressed in the form of a strand. On the outlet side, the emerging strands of plastic melt are knocked or cut off by a rotating cutter head, so that plastic pellets are obtained, which in the case of an underwater pelletizer are carried away by the process fluid flowing around the cutting head.

Some of the factors that affect the quality of the plastic pellets and of the pelletizing process include the shape and surface accuracy of the die plate on its outlet side, and the precise geometrical interaction between the outlet side of the die plate and the cutting or knock-off tools passing over the same. If wear results in irregularities on the die plate outlet side, the plastic material can start to smear on the die plate outlet side, impairing the neat cutting or knocking off of the pellets. One known approach to avoid or correct this problem has been to surface-grind the die plate of the pelletizer from time to time and, instead of the cutter head, use a grinding head with an end-face abrasive coat which is urged against the outlet side of the die plate in order to surface-grind the latter. However, the surface accuracy and fineness that can be achieved is limited and, due to the usual uniaxial rotatory grinding movement, annular ridges can be cut into the die plate surface.

In addition to wear on the die plate, wear on the cutting tools also can impair the pelletizing process. Usually, cutting plates which can be mounted in cutting plate holders at the desired angle are used as cutting tools so that they can pass over the die plate in the specified angular position, in order to knock off the emerging melt. In this regard, it is known to use turnover plates, i.e. cutting plates that can be turned over in the cutting plate holders, so that both sides of the usually rectangular cutting plates can be used, until they must be discarded due to excessive wear. The stability of the cutting plates is, however, limited and, when changing the cutting surface, differences in shape with respect to the ground outlet side of the die plate sometimes are obtained.

SUMMARY OF THE INVENTION

The present invention addresses the foregoing problems by creating an improved pelletizing device and an improved cutter and/or grinding head for a pelletizer, which avoid the disadvantages of the prior art and develop the latter in an advantageous way. In particular, an improved tool head is provided which equally allows both grinding of the outlet side of the die plate of the pelletizer and cutting or knocking off of the plastic melt emerging from the die plate. The tool head in accordance with the present invention also exhibits improved service life with more favorable wear properties of the working tool.

In accordance with the present invention, therefore, an improved cutting and/or grinding head is provided for a pelletizer, preferably an underwater pelletizer, and a pelletizer having such a head. The head includes a tool carrier to be driven rotatably about a tool carrier axis of rotation, and at least one cutting and/or grinding tool for knocking off plastic melt emerging from a pelletizer die plate and/or for grinding the pelletizer die plate. The cutting and/or grinding tool is rotatably mounted on the tool carrier about an axis of rotation spaced from the tool carrier axis of rotation. The axis of rotation of the cutting and/or grinding tool extends substantially parallel to the tool carrier axis of rotation. The cutting and/or grinding tool includes a substantially planar end face extending perpendicular to the tool's axis of rotation, for bearing against the pelletizer die plate, with the end face being adapted to be provided with an abrasive coat and/or an abrasive structure. The cutting and/or grinding tool is rotatably supported on the tool carrier free from a rotatory drive in a freely self-rotating manner.

Thus, it is proposed to attach the at least one cutting and/or grinding tool to the tool carrier not rigidly in a specified position, but to provide the same with an additional degree of freedom or an additional axis of movement with respect to the tool carrier, so that the cutting and/or grinding tool can move with respect to the tool carrier. In accordance with the invention, the cutting and/or grinding tool is rotatably mounted on the tool carrier about an axis of rotation spaced from the tool carrier axis of rotation. This provides a second component of movement for the cutting and/or grinding tool. On the one hand, the cutting and/or grinding tool rotates together with the tool carrier about its tool carrier axis of rotation, and on the other hand, the cutting and/or grinding tool can rotate about its own axis of rotation relative to the tool carrier. The tool carrier has a pivot bearing for the cutting and/or grinding tool, by means of which the cutting and/or grinding tool can rotate about itself.

Due to the additional component of movement of the cutting and/or grinding tool, the wear of the cutting and/or grinding tool itself can be rendered more uniform, as different portions are worn depending on the rotary position, which in the course of time adds up to a uniform wear. In addition, especially in the grinding process, when the grinding and/or cutting tool is used for grinding, the superimposed component of movement can prevent the formation of annular ridges around the tool carrier axis of rotation. On the outlet side of the die plate, a much finer surface of greater shape accuracy is achieved. Furthermore, the rotary movement of the grinding and/or cutting tool about itself can also be utilized for a better removal of the pellets knocked off, and for cutting or knocking off the next strand of plastic melt as a fresh portion of the tool is effectively made available.

The axis of rotation of the cutting and/or grinding tool in accordance with the present invention advantageously extends substantially parallel to the tool carrier axis of rotation. The tool axis of rotation may also be slightly inclined with respect to the tool carrier axis of rotation, which can be advantageous for generating the rotary movement of the cutting and/or grinding tool. What is preferred, however, is a parallel arrangement of the axis of rotation of the cutting and/or grinding tool with respect to the tool carrier axis of rotation.

In accordance with a development of the present invention, the axis of rotation of the cutting and/or grinding tool is aligned on the tool carrier to be directionally stable. Alternatively, the axis of rotation of the cutting and/or grinding tool can be arranged or mounted so as to be tiltable to a limited extent, in order to achieve a self-adjustment of the cutting and/or grinding tool or to compensate for minor alignment errors. The cutting and/or grinding tool can be self-adjusting, so to speak, so that it can slightly tilt with respect to the tool carrier. To achieve a simple, stable mounting, the directionally stable mounting of the axis of rotation on the tool carrier as described above, however, is preferred.

In accordance with an advantageous development of the present invention, the cutting and/or grinding tool is mounted on the tool carrier free from a rotatory drive so as to be freely self-rotating. In operation of the cutter and/or grinding head, the cutting and/or grinding tool remains rotatable, wherein the desired rotary movement is obtained by the cooperation of the cutting and/or grinding tool with the die plate, in particular by the different peripheral speeds of different portions of the cutting and/or grinding tool relative to the die plate. When the cutting and/or grinding tool passes around the tool carrier axis of rotation on a circular path as a result of the rotation of the tool carrier, a portion of the cutting and/or grinding tool located radially further to the outside has a greater peripheral speed than a portion located closer to the inside. This difference leads to a rotation of the cutting and/or grinding tool during operation about its own axis of rotation. As an alternative to such drive-free mounting and self-rotating configuration of the cutting and/or grinding tools, a drive for the forced driving of the cutting and/or grinding tool relative to the tool carrier might be provided, for instance in the form of an intermediate transmission, which derives the corresponding rotary movement of the cutting and/or grinding tool from the rotary movement of the tool carrier. In this way, higher relative speeds can be achieved between the tool and the die plate surface. What is preferred, however, is the above-described drive-free and self-rotating configuration of the cutting and/or grinding tool, as a certain irregularity in the rotary speed can provide advantages with respect to an accurately ground die plate surface.

In accordance with another development of the present invention, the axis of rotation of the cutting and/or grinding tool is arranged at a fixed distance from the tool carrier axis of rotation. This fixed distance advantageously is chosen such that the cutting and/or grinding tool passes over the pelletizer die plate in the vicinity of at least one associated outlet bore or melt passage outlet duct.

In accordance with an alternative embodiment of the present invention, an adjusting device for the distance of the axis of rotation of the cutting and/or grinding tool can, however, also be provided, so that the distance of the axis of rotation of the cutting and/or grinding tool from the tool carrier axis of rotation is adjustable. With such adjustability, the cutting or grinding head can be used for different pelletizer die plates. When using a pelletizer die plate with a larger hole center distance, for example, the cutting and/or grinding tool merely is moved further to the outside on the tool carrier, i.e., the tool is moved further away from the tool carrier axis of rotation, so that the tool is adapted to the corresponding geometry of the pelletizer die plate.

In principle, the adjusting device for the distance of the axis of rotation of the cutting and/or grinding tool can be formed differently. For instance, the tool carrier can include a slotted longitudinal guideway in the form of an oblong-hole guideway in which the cutting and/or grinding tool can be moved in order to adjust the distance of the tool from the tool carrier axis of rotation. In accordance with a preferred development of the present invention, the adjusting device also can include a swivel arm configured to be pivotally attached to the body of the tool carrier and to carry the cutting and/or grinding tool and its axis of rotation. When the swivel arm is swiveled further to the outside, the distance of the cutting and/or grinding tool mounted thereon from the tool carrier axis of rotation is increased. Conversely, the distance between the cutting and/or grinding tool and the tool carrier axis of rotation can be reduced by swiveling the swivel arm to the inside.

Advantageously, a fixing device is associated with the adjusting device, by means of which at least two different distances of the tool axis of rotation from the tool carrier axis of rotation can be fixed. The fixing device can include, for example, a positive locking device and/or a clamping device, for instance in the form of a clamping screw bolt.

In principle, the rotatably mounted cutting and/or grinding tool can have different geometries and configurations. In accordance with a development of the present invention, the cutting and/or grinding tool can have a substantially planar end face for bearing against the pelletizer die plate so that the planar end face does not need to extend over the entire cross-section of the working head of the cutting and/or grinding tool. For instance, the working head of the cutting and/or grinding tool can also have an annular end face and a concave recess in the center of the end face, so that only the annular surface bears against the die plate. Advantageously, at least the annular end face is formed flat and extends in a plane vertical to the axis of rotation of the tool.

For surface grinding the pelletizer die plate, the end face of the cutting and/or grinding tool can be provided with an abrasive coat and/or an abrasive structure. For instance, an abrasive coat can be applied in the form of a diamond grain carpet on the end face of the cutting and/or grinding tool. Alternatively, or in addition, the end face of the cutting and/or grinding tool can also be provided with a microstructure incorporated in the material of the working head. The microstructure may, for example, be in the form of fishscales with corresponding cutting or grinding edges, which provide for a machining, abrasive removal of material on the die plate. Alternatively or in addition, a grinding fluid or emulsion containing abrasive grains can also be applied to the die plate or between the die plate and the grinding head, in order to achieve an abrasive effect without requiring an abrasive coat on the end face of the working head.

To be able to selectively also operate only as a cutting tool for knocking off the strands of plastic melt, the abrasive coat can be releasably connectable with the end face of the tool working head, for instance be clampable onto a backing pad in the manner of a grinding wheel. Alternatively, or in addition, the cutting and/or grinding tool can releasably and replaceably be mounted on the tool carrier, so that a grinding tool with abrasive coat and a cutting tool without abrasive coat can selectively be mounted on the tool carrier. Independent of the exchangeability of different types of tool, the replaceability of the cutting and/or grinding tool on the tool carrier is advantageous, in order to avoid the need to replace the entire cutting or grinding head in the case of wear.

Depending on the plastic melt to be pelletized, different configurations and geometries of the cutting and/or grinding tool can be advantageous. In particular, differently formed cutting or knock-off edges can be used, in order to pelletize the emerging strands of plastic melt in the desired way. In an advantageous embodiment of the present invention, the cutting and/or grinding tool is formed symmetrical with respect to its axis of rotation and/or have segments which can be made to coincide by rotation about the axis of rotation, so that there is no continuous rotation symmetry, so to speak, but a symmetry upon rotation about a predetermined angular amount. The tool can have a pitch and be divided into segments which can be made to coincide by rotating the same by the corresponding pitch angle.

In particular, the cutting and/or grinding tool can have a rotationally symmetric working head with circular cross-section in accordance with a preferred development of the invention, so that the cutting and/or grinding tool can rotate and wear with near complete uniformity, having a working edge uniform over 360° for knocking or cutting off the plastic strands during pelletizing.

Alternatively, however, the working head can also have a cross-section different from the circular shape, in particular in the form of a peripheral contour with pitch-symmetrically identically shaped segments, as mentioned above. When providing a plurality of congruent peripheral segments, different working head geometries can be chosen. For instance, the working head can have a generally blossom- and/or flower-shaped contour which is divided into a plurality of arcuate peripheral segments. Alternatively, or in addition, the working head of the cutting and/or grinding tool also can have a polygonally profiled contour with preferably rounded transitions between the polygon portions. For example, a substantially polygonal, such as a hexagonal or octagonal working head, with rounded transitions between the segments can be provided.

To cleanly cut and pelletize the plastic strands emerging from the melt ducts of the die plate, the cutting and/or grinding tool has a peripheral flank constituting a cutting and/or knock-off edge in accordance with a development of the present invention. The cutting and/or knock-off edge advantageously extends around the tool axis of rotation, and in particular with a circular cross-section of the working head, can form an annular flank which defines a cutting or knock-off edge extending over 360°. Alternatively, a segmental configuration of the cutting and/or knock-off edge can be provided, which in terms of a pitch angle advantageously is congruent, for instance in the above-mentioned blossom shape or traverse shape with rounded transitions, so that cutting and/or knock-off edge segments are provided, which extend over six times 60°.

Depending on the plastic melt to be cut, different angles of inclination of the peripheral flank or of the cutting and/or knock-off edge formed by the flank can be advantageous. In accordance with a development of the present invention, the peripheral flank includes a flank angle in the range from 110° to 30° with respect to an end plane of the working head vertical to the axis of rotation. In accordance with a preferred development of the present invention, the flank angle can lie in the range from 90° to 45°, in particular about 90° to 75°.

As viewed in a longitudinal section including the axis of rotation of the tool, the peripheral flank can have different shapes, for instance be formed convex or also concave. Depending on its configuration, such curved shape of the flank can effect a sharper separation of the melt strands or a more impulsive or forceful knocking off. In accordance with a preferred development of the present invention, however, the peripheral flank as viewed in a longitudinal section including the axis of rotation of the tool has a straight flank, which can be inclined at the aforementioned flank angles with respect to the vertical end plane.

BRIEF DESCRIPTION OF THE DRAWINGS

The invention will subsequently be explained in detail with reference to preferred embodiments and associated drawings.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
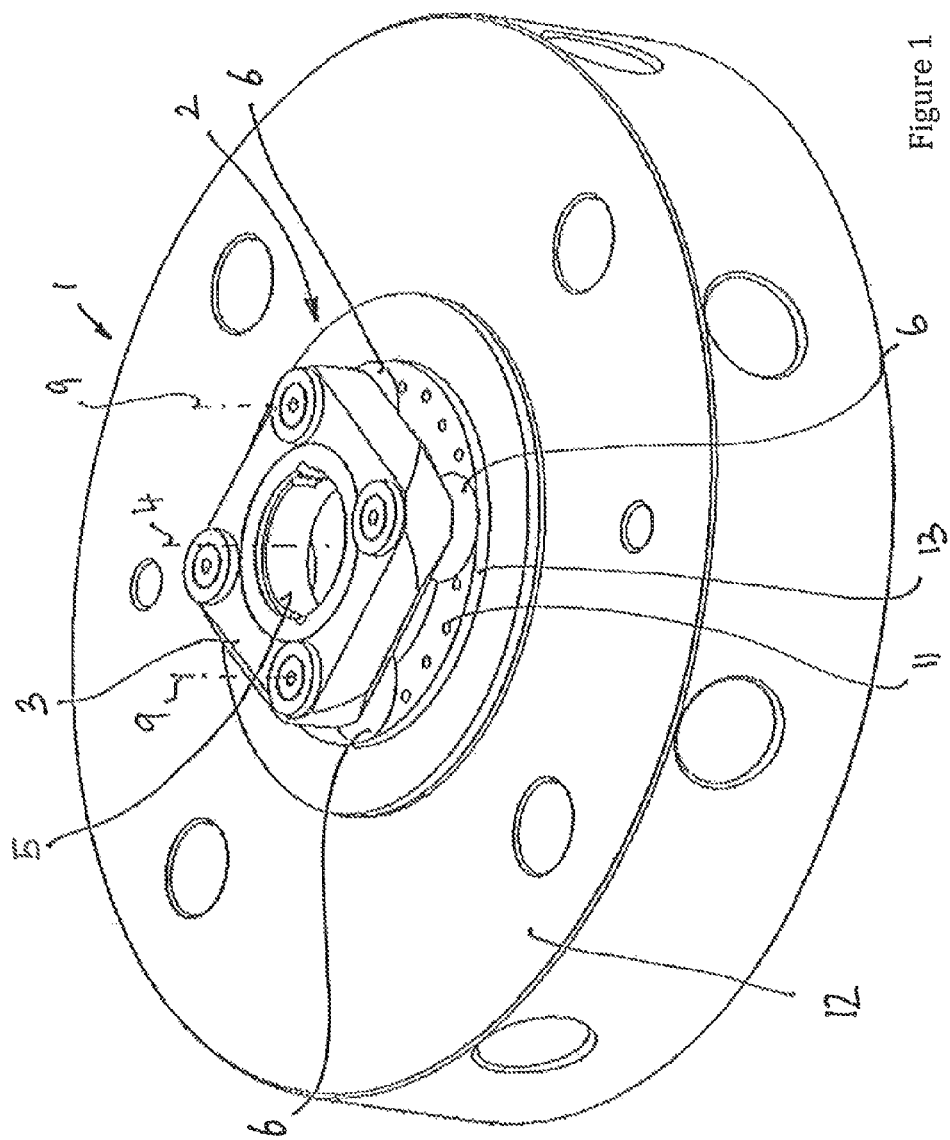
FIG. 1 is a schematic, perspective representation of a cutting and grinding head of an underwater pelletizer on the pelletizer die plate in accordance with an advantageous embodiment of the present invention.

In the embodiment illustrated in FIG. 1, the only partly represented pelletizing device 1 includes a cutting and grinding head 2 that includes a substantially plate-like, ring-shaped tool carrier 3. The tool carrier 3 can be rotatably driven about a tool carrier axis of rotation 4 by a drive shaft (not shown). In the illustrated embodiment of the device 1, the tool carrier 3 has a central, hub-like recess 5, by means of which the tool carrier 3 can be mounted on the drive shaft or on a cutting and grinding head bearing provided thereon.

As shown in FIGS. 1 to 4C, the tool carrier 3 carries a plurality of cutting and grinding tools 6 spaced from the tool carrier axis of rotation 4, which are arranged on the end face of the tool carrier 3 and axially protrude beyond the body of the tool carrier 3. Advantageously, between two and ten, and preferably between two and six, cutting and grinding tools 6 are provided. In the illustrated embodiment, four of such cutting and grinding tools 6 advantageously are attached to the tool carrier 3. The cutting and grinding tools 6 can be formed differently. Advantageously, however, identically formed cutting and grinding tools are attached to the tool carrier 3.

In accordance with the embodiments illustrated in FIGS. 1 to 4C, the cutting and grinding tool 6 includes a rotationally symmetric, approximately plate-shaped working head 7, which in the illustrated embodiments as shown in FIGS. 1 to 4C has a circular cross-section. The cutting and grinding tools 6 each are rotatably mounted on the tool carrier 3. The pivot bearings 8 provided for this purpose advantageously each have an axis of rotation 9, which extends substantially parallel to the central tool carrier axis of rotation. The pivot bearings 8 are preferably recessed or integrated in the body of the tool carrier 3.

As shown in FIGS. 5A to 5D, the cutting and grinding tools 6 can include a bearing portion 10 molded to the working head 7, which can have the shape of a bearing pin or another suitable form of bearing member. In general, the cutting and/or grinding tool 6 thereby obtains a generally mushroom-like configuration.

The cutting and grinding tools 6 are freely rotatable on the tool carrier 3 by means of the pivot bearings 8. Although the tools 6 are mounted on the tool carrier 3 free from drive, they nevertheless perform a rotary movement in operation. As shown in FIG. 1, the cutting and grinding tools 6 are spaced from the tool carrier axis of rotation 4 such that they approximately come to lie on the melt passages 11 of the pelletizer die plate 12 or on the outlets thereof. In the illustrated embodiment as shown in FIG. 1, the melt passages 11 in the pelletizer die plate 12 are arranged on a circle or arranged in an annular portion, which slightly protrudes with respect to the remaining body of the pelletizer die plate 12 and forms a flat end face of the pelletizer die plate 12.

The substantially flat end face of the cutting and grinding tools 6 is seated on a ring portion 13 of the pelletizer die plate 12. When rotating together with the tool carrier 3 about its tool carrier axis of rotation 4, different portions of the tools 6 undergo different peripheral speeds which effects a self-rotation of the cutting and grinding tools 6 about their respective axes of rotation 9. The cutting and grinding tools 6 thus perform two superimposed rotary movements, namely the rotary movement about the tool carrier axis of rotation 4 and the superimposed self-rotation about the respective tool axes of rotation 9.

Figure 4A:
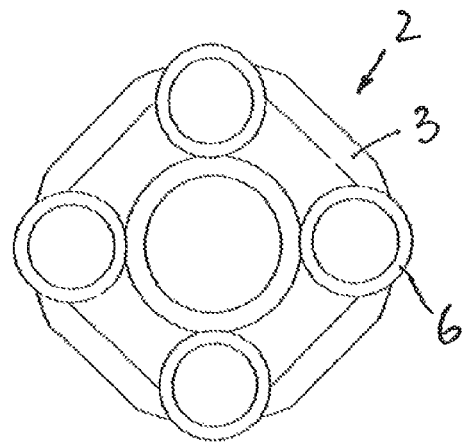
FIG. 4A is a top view of a third embodiment of the cutting and grinding head of the pelletizer shown in FIG. 1 in which the cutting and knock-off flank of the cutting and grinding tools has a flank angle of 90°.
Figure 4B:
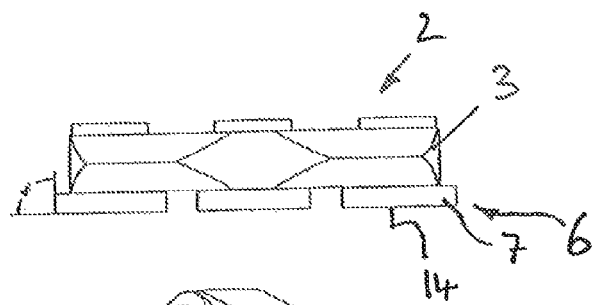
FIG. 4B is a side view of the cutting and grinding head shown in FIG. 4A.
Figure 4C:
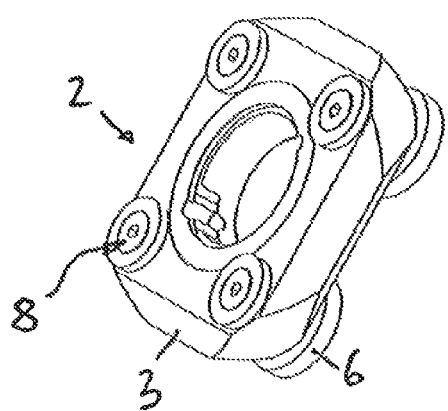
FIG. 4C is a perspective view of the cutting and grinding head shown in FIGS. 4A and 4B.
Figure 5A:
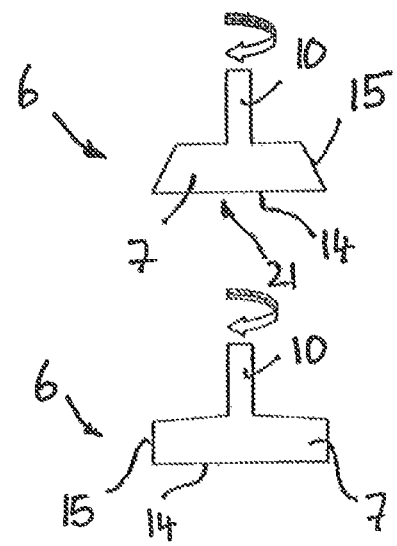
FIG. 5A is a side view of a first tool geometry of the cutting and grinding heads of the rotatably mounted cutting and grinding tool in accordance with the present invention.
Figure 5B:
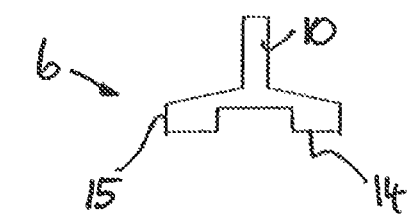
FIG. 5B is a side view of a second tool geometry of the cutting and grinding heads of the rotatably mounted cutting and grinding tool in accordance with the present invention.
Figure 5C:
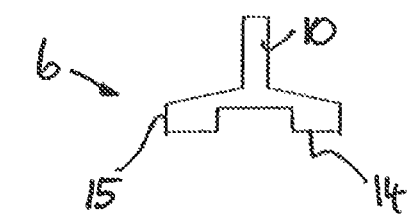
FIG. 5C is a side view of a third tool geometry of the cutting and grinding heads of the rotatably mounted cutting and grinding tool in accordance with the present invention.

As shown more clearly in FIGS. 5A-5D, the working heads 7 of the cutting and grinding tools 6 have a flat end face 14, which possibly can be ring-shaped, as is shown in FIG. 5C. The end face 14 is surrounded by an annular peripheral flank 15, which forms a cutting or knock-off edge for cutting off or separating the strands of plastic melt emerging from the melt passages 11. In principle, the working head 7 can have a substantially cylindrical contour, as is also shown in FIGS. 4A-4C as well as FIGS. 5B, 5C and 5D. In the case of a cylindrical contour, the peripheral flank 15 is inclined at an angle of 90° with respect to an end-face plane of the respective working head 7, which is vertical to the axis of rotation 9 (see FIG. 4B).

Figure 2A:
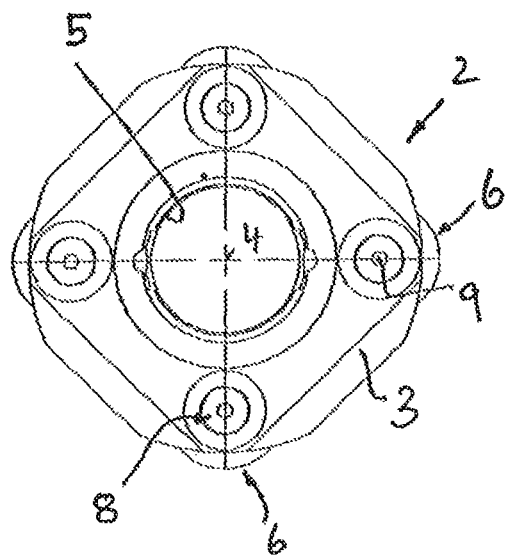
FIG. 2A is a top view of the cutting and grinding head of a first embodiment of the underwater pelletizer of FIG. 1.
Figure 2B:
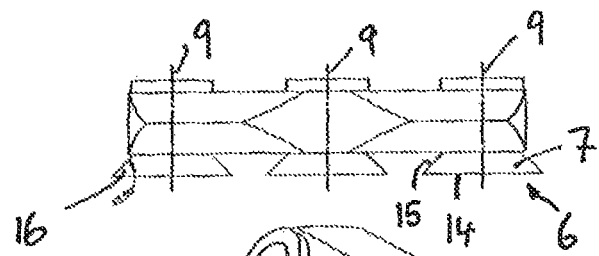
FIG. 2B is a side view of the cutting and grinding head shown in FIG. 2A.
Figure 2C:
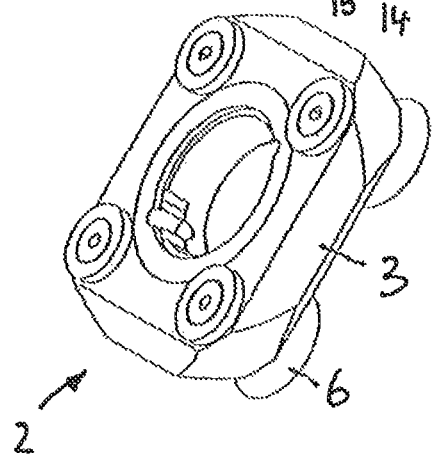
FIG. 2C is a perspective view of the cutting and grinding head shown in FIGS. 2A and 2B.
Figure 3A:
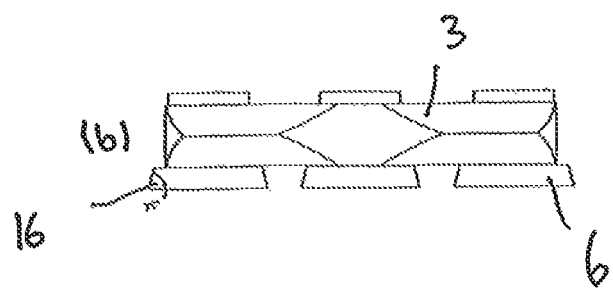
FIG. 3A is a side view of a second embodiment of the cutting and grinding head of the pelletizer shown in FIG. 1 in which the cutting and knock-off flank of the cutting and grinding tool has a flank angle of 75°.
Figure 3B:
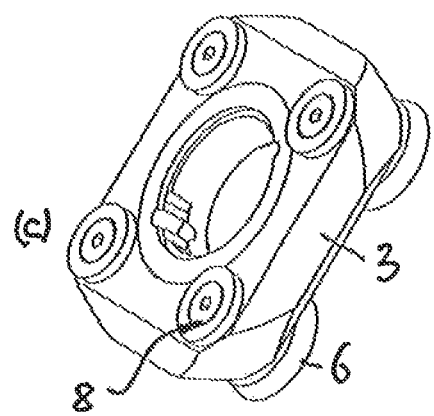
FIG. 3B is a perspective view of the cutting and grinding head shown in FIG. 3A.

Alternatively, the working head 7 can also be conical with a peripheral flank 15 that is inclined at an acute angle with respect to the end-face plane. FIGS. 2A-2C show a conically formed working head 7 with a flank angle of about 45°, whereas the embodiment of FIGS. 3A and 3B shows a conical working head with a flank angle of about 75°. The smaller the flank angle 16, the sharper the melt strands are cut through, whereas with a more vertical peripheral flank they are knocked off impulsively, i.e., with greater force or energy.

Figure 5D:
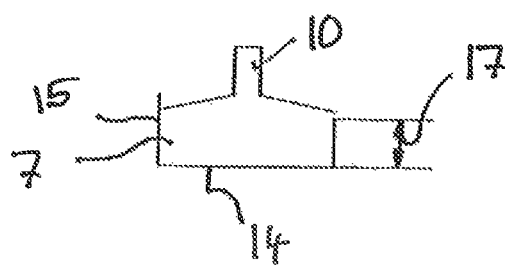
FIG. 5D is a side view of a fourth tool geometry of the cutting and grinding heads of the rotatably mounted cutting and grinding tool in accordance with the present invention.

The height of the working head 7 of the cutting and grinding tools 6, as measured in the direction of the axis of rotation 9, can be adapted to the different plastic melts to be pelletized and can vary. In accordance with a preferred development of the invention, the height 17 of the working head 7 is smaller than the diameter of the working head 7 as shown in FIG. 5D. With this configuration, the height 17 preferably is less than half the diameter, in particular less than one third of the diameter of the working head 7. For instance, the height 17 can lie in the range from about one tenth to about one third of the diameter of the working head 7.

The diameter of the working head 7 of the cutting and grinding tools 6 likewise can be adapted to the different pelletizing conditions and, in particular, to the geometry of the pelletizer die plate 12. In accordance with an advantageous embodiment, the working head diameter can be about 10% to 150%, preferably about 30% to 100%, and most preferably about 50% to 75% of the distance of the axes of rotation 9 from the central tool carrier axis of rotation 4. In principle, the axes of rotation 9 of the cutting and grinding tools 6 can be arranged at different distances from the central tool carrier axis of rotation 4, in particular when the pelletizer die plate 12 includes more than one melt passage circle. In accordance with the illustrated embodiment, however, the cutting and grinding tools 6 advantageously can all be arranged at the same distance from the central tool carrier axis of rotation 4.

Figure 7:
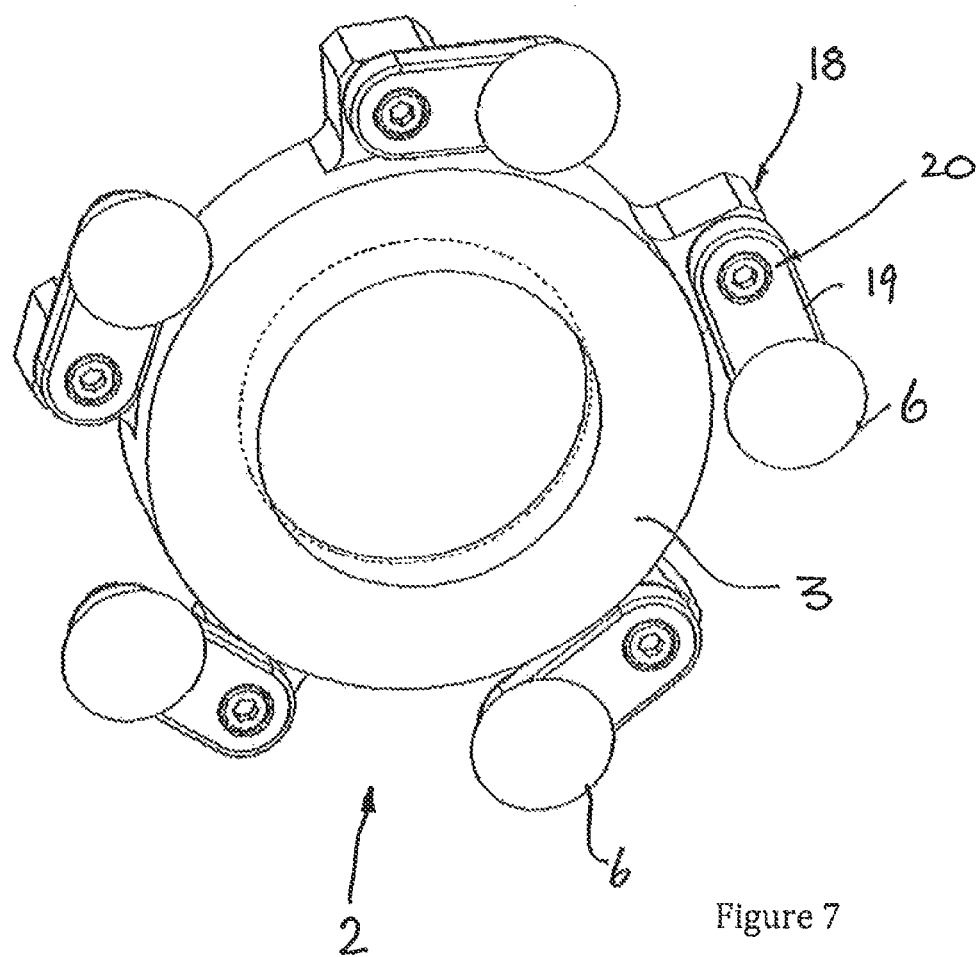
FIG. 7 is a perspective view of a cutting and grinding head of an underwater pelletizer in a further advantageous embodiment of the invention, according to which the tool carrier includes an adjusting device in the form of swivel arms for adjusting the distance of the axes of rotation of the cutting and grinding tools from the tool carrier axis of rotation.

FIG. 7 shows another advantageous embodiment of the present invention, according to which the tool carrier 3 is adjustable with respect to the distance between the axis of rotation 9 of the cutting and grinding tools 6 and the central tool carrier axis of rotation 4. In the illustrated embodiment, the corresponding adjusting device 18 includes swivel arms 19. One end of the swivel arms is pivotally attached to the body of the tool carrier 3, namely about swivel axes which extend parallel to the central tool carrier axis of rotation 4. The other protruding end of the swivel arms 19 carries the cutting and grinding tools 6 together with their axes of rotation 9 and the associated pivot bearings 8. When the swivel arms 19 are swiveled further to the outside, the distance of the cutting and grinding tools 6 from the tool carrier axis of rotation 4 is increased. Conversely, the distance between the cutting and grinding tools 6 and the tool carrier axis of rotation 4 can be reduced by swiveling the swivel arms 19 to the inside. The cutting and grinding tools 6 advantageously can be adjusted individually, so that different distances can be adjusted for different cutting and grinding tools 6, for instance such that every second cutting and grinding tool 6 is running further on the outside than every third cutting and grinding tool. The adjusting device 18 includes a fixing device for fixing the respectively desired position. In the illustrated embodiment, the fixing device includes clamping bolts 20 for clamping the swivel arms 19 in the respective swivel position.

Figure 6E:
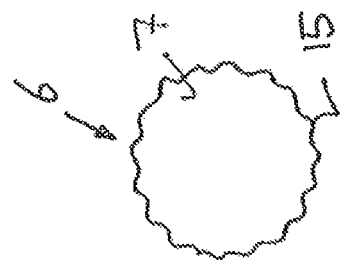
FIG. 6E shows a top cross-sectional view of a fifth peripheral contour of a cutting and grinding head of the cutting and grinding tool in accordance with the present invention.
Figure 6D:
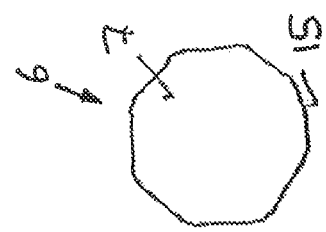
FIG. 6D shows a top cross-sectional view of a fourth peripheral contour of a cutting and grinding head of the cutting and grinding tool in accordance with the present invention.
Figure 6C:
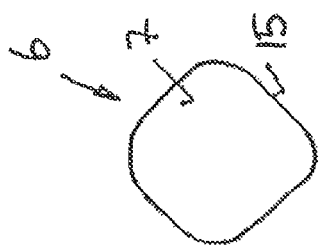
FIG. 6C shows a top cross-sectional view of a third peripheral contour of a cutting and grinding head of the cutting and grinding tool in accordance with the present invention.
Figure 6B:
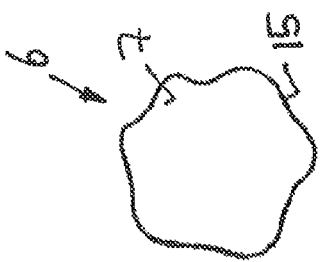
FIG. 6B shows a top cross-sectional view of a second peripheral contour of a cutting and grinding head of the cutting and grinding tool in accordance with the present invention.
Figure 6A:
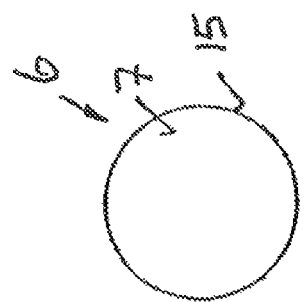
FIG. 6A shows a top cross-sectional view of a first peripheral contour of a cutting and grinding head of the cutting and grinding tool in accordance with the present invention.

As shown in FIGS. 6A to 6E, the working head 7 can have different cross-sections, for instance a circular cross-section in accordance with an advantageous development of the invention shown in FIG. 6A. Alternatively, blossom- or flower-shaped peripheral contours can be specified as shown in FIGS. 6B and 6E. As a further alternative, polygonal peripheral profiles, preferably with rounded transitions, are possible as shown in FIGS. 6C and 6D.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A cutting/grinding head for a pelletizer, comprising a tool carrier to be driven rotatably about a tool carrier axis of rotation, and at least one cutting/grinding tool for knocking off plastic melt emerging from melt passages of a pelletizer die plate and for grinding a surface of said pelletizer die plate, said at least one cutting/grinding tool being rotatably mounted on said tool carrier about an axis of rotation spaced from the tool carrier axis of rotation, said axis of rotation of said at least one cutting/grinding tool extending substantially parallel to the tool carrier axis of rotation and substantially perpendicular to the die plate surface, said at least one cutting/grinding tool positioned on an outlet side of said die plate and including a substantially planar end face extending perpendicular to said axis of rotation of said at least one cutting/grinding tool for bearing against said pelletizer die plate outlet side to knock off or cut strands of plastic melt emerging from the die plate melt passages, said planar end face of said at least one cutting/grinding tool being provided with an abrasive coat to grind the die plate, and said at least one cutting/grinding tool being rotatably supported on said tool carrier free from a rotatory drive in a freely self-rotating manner.

2. The cutting/grinding head according to claim 1, wherein the tool carrier includes an adjusting device for adjusting distance of the axis of rotation of said at least one cutting/grinding tool from the tool carrier axis of rotation.

3. The cutting/grinding head according to claim 2, wherein the adjusting device includes a swivel arm, pivotally mounted on the body of the tool carrier and carries said at least one cutting/grinding tool together with its axis of rotation.

4. The cutting/grinding head according to claim 3, wherein a fixing element is provided for fixing the swivel arm in at least two different swivel positions relative to the body of the tool carrier.

5. The cutting/grinding head according to claim 1, wherein the at least one cutting/grinding tool is formed symmetrical with respect to its axis of rotation and includes a plurality of segments configured to be congruently transferred into each other by rotating about the axis of rotation of said at least one cutting/grinding tool.

6. The cutting/grinding head according to claim 1, wherein the at least one cutting/grinding tool includes a rotationally symmetric working head with a circular cross-section.

7. The cutting/grinding head according to claim 1, wherein the at least one cutting/grinding tool includes a working head with a cross-section differing from a circular shape, wherein the working head is divided into a plurality of substantially congruent peripheral segments.

8. The cutting/grinding head according to claim 7, wherein the working head has a blossom- or flower-shaped contour with a plurality of arcuate peripheral segments.

9. The cutting/grinding head according to claim 7, wherein the working head has a traverse-shaped contour with rounded transitions between polygon portions.

10. The cutting/grinding head according to claim 1, wherein the at least one cutting/grinding tool includes a working head with a peripheral flank constituting a cutting/knock-off edge, wherein the cutting/knock-off edge is formed to extend around the axis of rotation of said at least one cutting/grinding tool.

11. The cutting/grinding head according to claim 10, wherein the cutting/knock-off edge is formed rotationally symmetric with respect to the axis of rotation of said at least one cutting/grinding tool and/or segmentally congruent with respect to the axis of rotation of said at least one cutting/grinding tool.

12. The cutting/grinding head according to claim 10, wherein the peripheral flank of the working head of the at least one cutting/grinding tool has a straight flank extension as viewed in a longitudinal section including the axis of rotation of said at least one cutting/grinding tool.

13. The cutting/grinding head according to claim 10, wherein the peripheral flank of said working head includes a flank angle between 110° and 30°, with respect to an end-face plane of said working head that is vertical to the axis of rotation of said at least one cutting/grinding tool.

14. The cutting/grinding head according to claim 1, wherein a plurality of cutting/grinding tools are provided spaced from each other in a peripheral direction around the tool carrier axis of rotation.

15. The cutting/grinding head according to claim 1 in combination with a pelletizer, said pelletizer die plate having at least one melt passage which is arranged in a vicinity of a path of circulation of the at least one cutting/grinding tool of the cutter and/or grinding head.

16. A pelletizer assembly comprising:
a pelletizer having a die plate with melt passages through which plastic melt is extruded;
a cutting/grinding head including,
a tool carrier to be driven rotatably about a tool carrier axis of rotation; and
at least one cutting/grinding tool operatively associated with said tool carrier for knocking off plastic melt emerging from the melt passages of said pelletizer die plate and for grinding said pelletizer die plate, said at least one cutting/grinding tool being rotatably mounted on said tool carrier about an axis of rotation spaced from the tool carrier axis of rotation and configured to be positioned substantially perpendicular to the die plate, said at least one cutting/grinding tool positioned adjacent an outlet side of said die plate and including a substantially planar end face extending perpendicular to said cutting/grinding tool axis of rotation for bearing against said pelletizer die plate outlet side to knock off or cut strands of plastic melt emerging from the melt passages in the die plate, said end face of said at least one cutting/grinding tool being abrasive so that said end face grinds a surface of the outlet side of the die plate during operation of the pelletizer, and said at least one cutting/grinding tool being configured to be rotatably supported on said tool carrier free from a rotatory drive in a freely self-rotating manner.

17. The pelletizer according to claim 16, wherein said at least one cutting/grinding tool includes a working head having said substantially planar end face and a peripheral flank constituting a cutting/knock-off edge, said cutting/knock-off edge being formed to extend around the axis of rotation of said at least one cutting/grinding tool, the peripheral flank having a flank angle between 90° and 45° with respect to the substantially planar end face.

18. The pelletizer according to claim 16, wherein said axis of rotation of said at least one cutting/grinding tool extends substantially parallel to the tool carrier axis of rotation.

19. A cutting/grinding head for a pelletizer having a die plate with melt passages therethrough, comprising a tool carrier to be driven rotatably about a tool carrier axis of rotation, and at least one cutting/grinding tool positioned adjacent an outlet side of said die plate and including a substantially cylindrical contour with a substantially flat end face and a peripheral flank, said at least one cutting/grinding tool configured to be mounted to said tool carrier free from a rotatory drive in a freely self-rotating manner and configured to be positioned substantially perpendicular to a die plate surface, said end face of said at least one cutting/grinding tool being perpendicular to said axis of rotation for bearing against said pelletizer die plate outlet side and said peripheral flank having a cutting/knock-off edge that cuts off strands of plastic melt emerging from the melt passages on the outlet side of the pelletizer die plate, said peripheral flank having a flank angle between 90° and 45° with respect to the flat end face of said at least one cutting/grinding tool, said end face of said at least one cutting/grinding tool being abrasive so that said end face grinds a surface of the outlet side of the die plate during operation of the pelletizer.

20. The cutting/grinding head according to claim 19 in combination with a pelletizer, said melt passages of said pelletizer die plate including at least one melt passage which is arranged in a vicinity of a path of circulation of the at least one cutting/grinding tool of the cutting/grinding head.

* * * * *